May 24, 1955  
J. BAUDE  
2,709,235  
CYCLE COUNTING CONTROL SYSTEM FOR SYNCHRONOUS  
DYNAMOELECTRIC MACHINE  
Filed June 9, 1952  
4 Sheets-Sheet 1
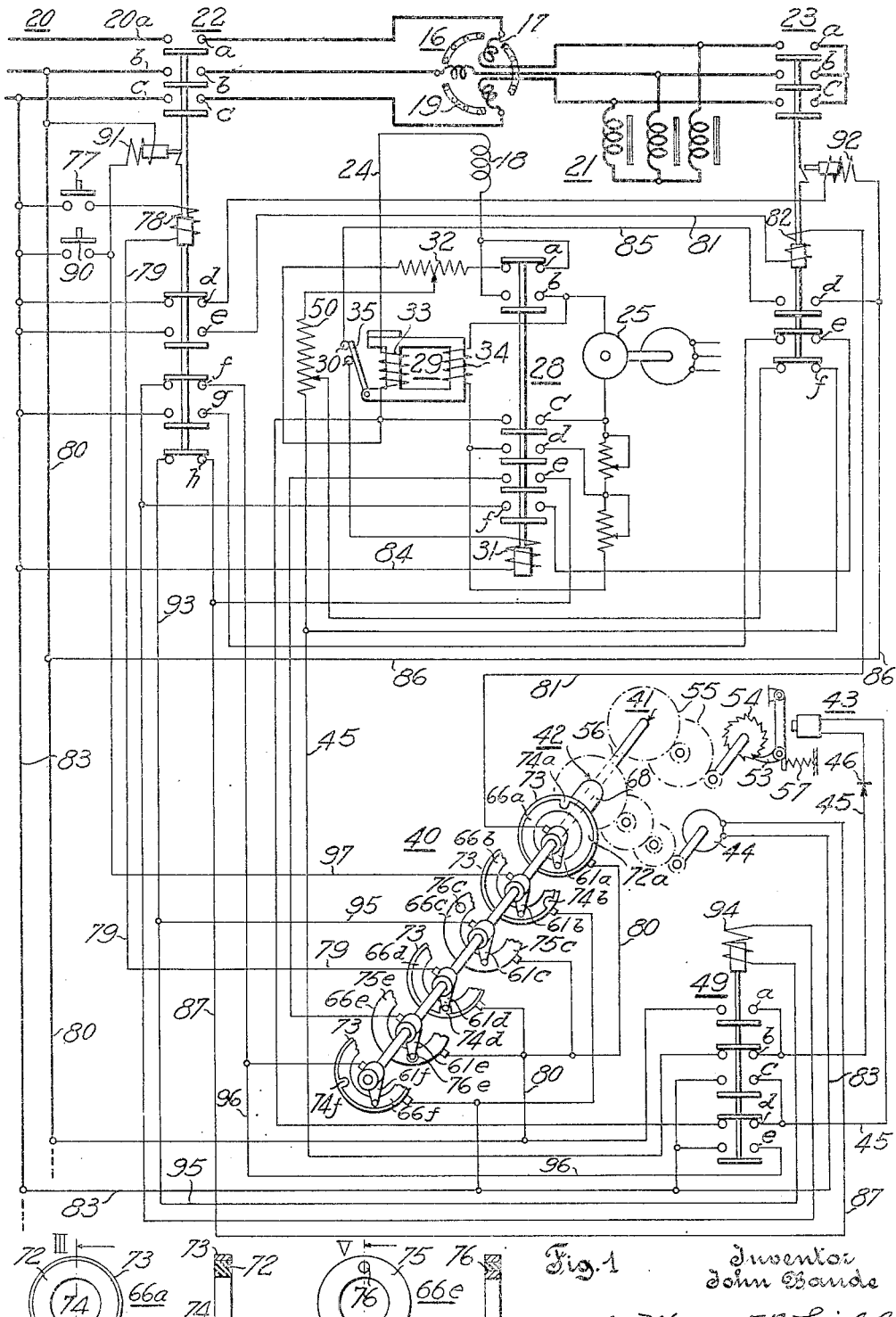
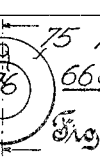
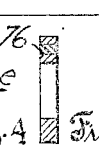
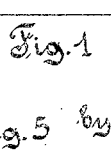
Fig. 1  
Fig. 2  Fig. 3  Fig. 4  Fig. 5
Inventor  
John Baude  
by Warren F.B. Seibel  
Attorney

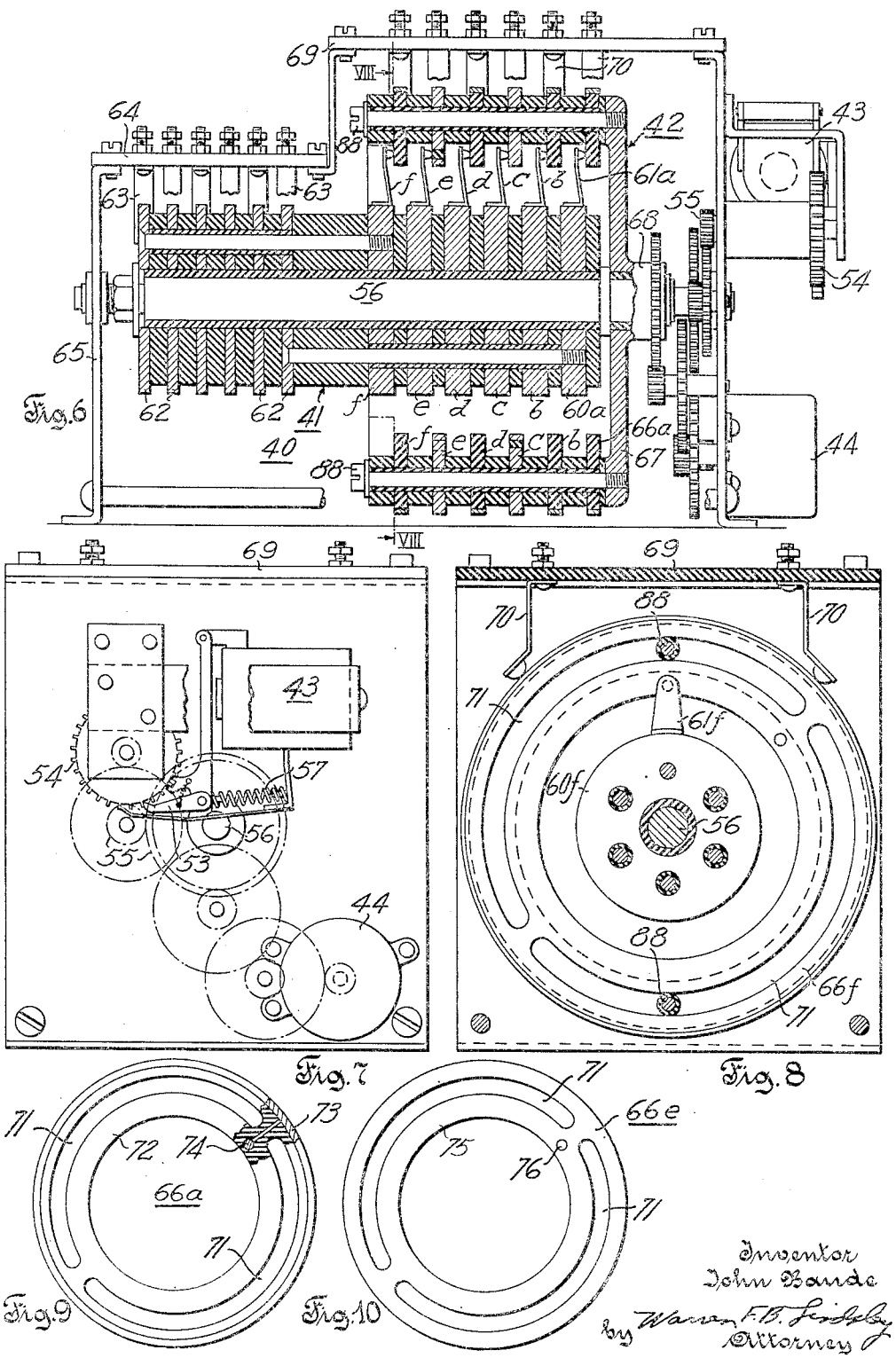

United States Patent Office 2,709,235
Patented May 24, 1955

2,709,235

CYCLE COUNTING CONTROL SYSTEM FOR SYNCHRONOUS DYNAMOELECTRIC MACHINE

John Baude, Milwaukee, Wis., assignor to Allis-Chalmers Manufacturing Company, Milwaukee, Wis.

Application June 9, 1952, Serial No. 292,409

21 Claims. (Cl. 318—167)

This invention relates to control arrangements and devices for electrical equipment and particularly to systems and devices for controlling the connections of alternating current motors so as to protect them against predetermined abnormal conditions. More particularly this invention relates to control devices for protecting a secondary winding of an alternating current motor, such as a squirrel cage winding of a synchronous motor, from becoming overheated by the currents induced therein when the motor is operating subsynchronously.

Heretofore squirrel cage windings of synchronous motors have been protected against overheating by devices which were responsive to a predetermined number of cycles of current induced in the field winding of the motor while it is operating subsynchronously. It is well known that when a synchronous motor is operating subsynchronously, the armature of the winding acts as a primary winding of a transformer to induce in the windings of the field structure voltages of slip frequency, and these voltages in turn cause currents of slip frequency to flow through and heat up the secondary windings if they are connected in closed circuits.

In the embodiments of the prior art, counting devices have been provided to count the number of slip cycles which have been induced in the secondary windings of a synchronous motor, and control arrangements associated with the synchronous motors have responded to a predetermined number of slip cycles counted to make a change in the connection of the synchronous motors. These counting devices have usually shut down the synchronous motors by deenergizing their primary winding after the cage windings have been heated to a predetermined temperature. However, none of the prior art has provided a means responsive to the number of slip cycles counting during subsynchronous operation of the motor for effecting the time of restarting or resynchronization of the motor. In other words, in the past it has been up to the operator of the motor to determine by human methods when the cage winding of the motor was sufficiently cooled so that another restarting operation could take place. This manner of restarting a synchronous motor after an operator has guessed that it has cooled sufficiently to permit a restarting operation at its best is inaccurate and the amount of time lost in restarting is usually excessive because of the safety factor needed when relying on the human being for judgment.

In accordance with this invention, new and improved control systems and devices are provided which may employ a first and second counting device, means for actuating the first counting device in response to each cycle of induced current in a secondary winding of an alternating current machine, means responsive to a predetermined number of actuations of the first counting device for effecting a change in the connections of the alternating current machine or to deenergize the primary winding of the machine, and means sequentially operative with the first counting device and responsive to a time delay action of the second counting device for effecting a restarting operation of the machine. Thus, new and improved control arrangements and devices for starting synchronous machines are provided in which a time delay device correlated with the rate of heating and cooling of a secondary winding, such as the cage winding of a synchronous motor, determines whether or not the motor control arrangement should respond to another motor starting operation.

It is therefore one object of this invention to provide a new and improved arrangement for controlling the connections of alternating current motors so as to protect them against predetermined abnormal conditions.

Another object of this invention is to provide a control arrangement for alternating current motors in which the motor is deenergized in the event that the motor heats up and exceeds a predetermined temperature after starting power is applied to the machine and in which the motor is maintained deenergized a period of time correlated with the rate of cooling of its secondary winding.

A further object of this invention is to provide a control arrangement for synchronous motors in which the slip cycle impulses induced in a secondary winding of the motor during a starting operation are counted and in which any restarting operation is responsive to the number of slip cycle impulses counted during previous starting operations and the cooling time needed to dissipate the heating effect of each slip cycle on the secondary winding.

A still further object of this invention is to provide a control arrangement for starting synchronous motors in which the motors are protected against restarting if their cage windings have reached a predetermined temperature.

Another object of this invention is to provide a control arrangement for starting synchronous motors in which the anticipated temperature of the cage windings governs the number of motor starting operations within a set time.

Another object of this invention is to provide a new and improved control arrangement for transferring from starting to running condition for synchronous motors.

Objects and advantages other than those set forth will be apparent from the following description when read in connection with the accompanying drawings, in which:

Fig. 1 is a diagrammatic view of a synchronous motor and a control counting device therefor embodying the present invention;

Fig. 2 is a front view of one of the disks of the counting devices shown in Fig. 1;

Fig. 3 is a cross sectional view of the disk illustrated in Fig. 2 taken along the line III—III;

Fig. 4 is a front view of another one of the disks of the counting device illustrated in Fig. 1;

Fig. 5 is a cross sectional view of the disk illustrated in Fig. 4 taken along the line V—V;

Fig. 6 is a sectional side view of a control device constructed in accordance with the present invention;

Fig. 7 is a right end view of the device shown in Fig. 6;

Fig. 8 is a sectional view of the device shown in Fig. 6 taken along the line VIII—VIII;

Fig. 9 is a front view of one of the disks shown in Fig. 6;

Fig. 10 is a front view of another one of the disks shown in Fig. 6;

Figure 11:
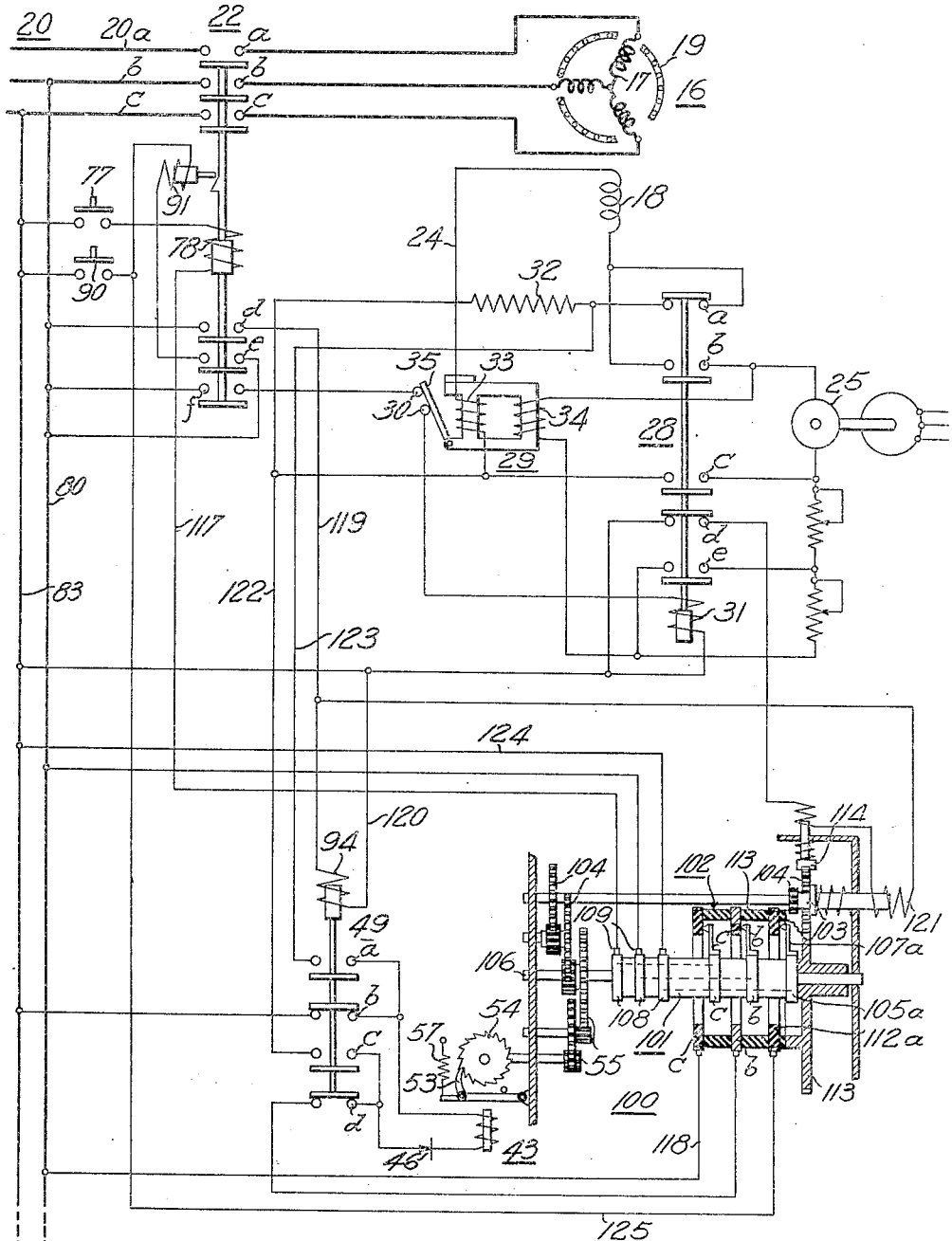
Fig. 11 is a diagrammatic view of a modification of the synchronous motor and control device therefor illustrated in Fig. 1.

Referring more particularly to the drawings by characters of reference, Fig. 1 illustrates an alternating current machine such as a synchronous motor 16 having an armature or primary winding 17, a field or secondary winding 18, and another secondary or squirrel cage winding 19. The synchronous motor 16 is connected to a suitable source such as sixty cycle alternating current 20 indicated by conductors 20a, 20b and 20c through connections including a starting reactor 21 and circuit breakers 22 and 23, which may be referred to as starting and running breakers, respectively. The field winding 18 is connected in series with a field discharge resistor 32 in a circuit 24 by a normally closed contact 28a of the field contactor or breaker 28. An exciter 25 may be driven from synchronous motor 16 or may be driven, as shown, by a separate motor and is used for the purpose of exciting the field winding 18. The field winding 18 is connected to and disconnected from the exciter 25 by means of contacts 28b and 28c of a field contactor or breaker 28. Contactor 28 is controlled by means of a field application relay 29, which has contacts 30 in circuit with a coil 31 of the contactor 28.

Field application relay 29 is a simple, rugged device operable to close contacts 30 during acceleration of motor 16, when the frequency and magnitude of the induced current in field winding 18 have diminished to the desired values. Relay 29 has an alternating current winding 33 which is energized with a current proportional to the current in field winding 18. A coil 34 provides a substantially constant flux in one direction through the core of relay 29, by reason of the energization of coil 34 from a substantially constant voltage direct current source, such as the exciter 25. Armature 35 is operatively responsive to the sum of the fluxes produced by coils 33 and 34. This particular field application relay 29 does not form a part of this invention and a detailed description thereof may be found in the United States Patent No. 2,478,693, W. I. Herziger, dated August 9, 1949.

For protecting the starting reactor 21 of synchronous motor 16 from overheating during times of excessive starting duty and for initiating the closure of running breaker 23, a new and improved slip cycle synchronous machine protective relay 40 is provided. Relay 40 also protects the starting or cage winding 19 of machine 16 from overheating due to overloads on unsuccessful starts, pull outs, and too frequent starts. The protection afforded by relay 40 is based upon the integration of slip cycles induced in the cage winding 19 and a correlated time characteristic for simulating cooling of the cage winding 19.

In the embodiment of the invention shown in Figs. 1 to 10, slip cycle relay 40 comprises two contact assemblies 41 and 42 which can be rotated with respect to each other to any extent. Contact assembly 41 is rotated by means of any suitable known cycle counting device such as a self-starting synchronous motor or a stepping relay 43. Contact assembly 42 is rotated by any suitable known counting device such as a synchronous motor 44. While contact assembly 42 is mounted upon shaft 56 of contact assembly 41, for the sake of clearness the respective disks 66a, 66f are shown disconnected from shaft 68 whereas they actually form a complete unit as more clearly shown in Fig. 6.

The stepping relay 43 is connected in series in a circuit 45 with a half wave rectifier 46, contacts 49b of a relay 49, a resistor 50, contacts 49d of relay 49, and winding 33 of relay 29 across all or a portion of the discharge resistor 32. Each time stepping relay 43 is energized, it moves a pawl 53 out of engagement with a ratchet wheel 54 rigidly secured to a gear train 55. When the relay is deenergized, a spring 57 causes pawl 53 to move ratchet wheel 54 so as to rotate a shaft 56 of contact assembly 41 clockwise to an extent corresponding to one tooth of ratchet wheel 54.

The motor 44 is connected across the power supply through a plurality of circuit breaker contacts as hereinafter explained.

The contact assemblies 41 and 42 are illustrated in Figs. 2 to 10 in the preferred embodiment but the invention may be practiced by the use of many different types of counting and circuit controlling devices. The embodiment shown in Figs. 2 to 10 and diagrammatically shown in Fig. 1 comprises a plurality of juxtaposed coaxial rotatable members or disks 66a to 66f, arranged on shaft 56. The disks are provided with finger contacts 61a to 61f which serve as current carrying members. The disks 60a to 60f all rotate together as a unit and are mechanically tied together with a plurality of coaxially arranged slip rings 62. Rings 62 are conductively connected by flexible brushes 63 to a terminal board 64 arranged on a frame 65 of the counting and control relay 40.

Finger members or contacts 61a to 61f make electrical contact with a plurality of juxtaposed separately angularly adjustable coaxial rotatable members or disks 66a to 66f. Refer to Figs. 8, 9 and 10 for a showing of grooves 71 and tie rods 88 which provide the adjustable features of disks 66a to 66f. These disks are secured to a drum shaped member 67 which is rotated about a shaft 68 by the motor 44. Disks 66a to 66f make electrical contact with terminals of a terminal board 69 through a plurality of brushes 70. Disks 66a to 66f comprise two different kinds of disks as more clearly illustrated in Figs. 9 and 10. Fig. 9 is representative of disks 66a, 66b, 66d and 66f and shows that each of these disks comprises an insulating member 72 having a conductive strip 73 arranged around its outer periphery. A contact 74 arranged within each member 72 is conductively connected to strip 73 mounted thereon and makes and breaks an electric circuit with a finger contact 61 upon relative rotation of shafts 56 and 68. Fig. 10 is representative of disks 66c and 66e and shows that each of these disks comprises a conductive member 75 having an insulating insert 76 (see Figs. 4 and 5). As finger contacts 61c and 61e move across the surfaces of disks 66c and 66e the electric circuits passing through these disks are interrupted when the finger contacts 61c and 61e pass over insulating inserts 76c and 76e.

In accordance with the invention the slip cycle synchronous motor protective relay arrangement functions as follows:

Refer to Fig. 1 and assume that the motor 16 is at a standstill and a starting pushbutton 77 is closed. Current flows from conductor 20c through pushbutton 77, the closing coil 78 of the starting breaker 22, a conductor 79, through finger contact 61d (which during a starting operation is in contact with contact 74d), through strip 73d, through conductor 80 and back to the power supply source conductor 20b. After the starting breaker 22 has closed as a result thereof the following conditions exist. The motor 16 starts to rotate and the cage winding 19 and the reactor 21 start to heat up under the influence of the currents induced in the cage winding and in the field winding. The frequency of these currents, called slip frequency, is the same in both windings and gradually decreases as the motor speeds up. The intensity of the cage winding current gradually decreases in time, so that the heating of the cage winding is roughly the same during each cycle of slip frequency current. The heating effect of the cage winding can therefore be expressed in terms of the numbers of its induced slip cycles. Current induced in the field winding 18 of motor 16 is circulated through a closed circuit comprising the field winding 18, the discharge resistor 32, and contacts 28a of field contactor 28. All or a portion of the voltage drop across the discharge resistor device 32 is used to circulate a current through the adjustable resistor 50, conductor 45, auxiliary relay contacts 49b of relay 49, rectifier 46, stepping relay 43, contacts 49d of relay 49 back to the discharge resistor 32.

The stepping relay 43, being energized by alternate half cycles of the current induced in the field winding 18, rotates shaft 56 of the contact assembly 41 at a speed which is proportional to the slip cycle frequency of the motor 16. After a predetermined number of slip cycles have elapsed and caused a predetermined number of step movements of ratchet wheel 54 and shaft 56, finger contact 61a makes electrical contact with contact 74a on insulating member 72a, thus completing an electric circuit from the source conductor 20b, through conductor 80, contact 74a, finger contact 61a, a conductor 81, closing coil 82 of running breaker 23, conductor 81, contacts 22e of starting breaker 22 and conductor 83 to the source conductor 20c. Closing of the running breaker by coil 82 then puts the synchronous machine or motor 16 on full voltage by short circuiting the starting reactor 21 by means of the contacts 23a, 23b and 23c of the running breaker 23. The effective resistance of the resistor 50 is increased by opening of contacts 23f at the moment the running breaker 23 closes. The purpose of this arrangement is to maintain normal voltage on the operating coil of relay 43 during the starting period of operation. After the running breaker 23 has closed, the stepping relay 43 remains energized by half cycles of induced current in the field winding 18 and the speed of relay 43 is proportional to the slip cycle frequency of the induced current in winding 18. The speed of relay 43 therefore decreases as motor 16 approaches synchronous speed. The movement of contact assembly 41 continues to be representative of the heating of cage winding 19. As the motor 16 approaches synchronous speed, if the cage winding 19 is not overheated the field frequency relay 29 drops its armature 35 to close its contacts 30 and current flows from conductor 20c through conductors 83, 84, closing coil 31 of field contactor 28, contacts 30, conductor 85, contacts 23d of running breaker 23, conductors 86, 80 to conductor 20b. The field contactor 28 disconnects field winding 18 from discharge resistor 32 and connects the field winding to exciter 25. Stepping relay 43 is deenergized with the discharge resistor by opening of the field contactor contacts 28a.

The closing of the field contactor 28 marks the successful completion of the starting operation of motor 16 before cage winding 19 has become overheated. The slip cycle relay 40 then resets its contact assembly 41 with a speed which is in a predetermined relation to the cooling rate of the cage winding 19. This cooling period may take several minutes and is a function of the synchronous motor design. The resetting operation of the slip cycle relay 40 proceeds so as to follow the temperature of the cage winding as follows:

Upon the closure of the field contactor 28, current flows from conductor 20c through conductor 83, synchronous motor 44, conductor 87, contacts 28e, finger contact 61e, metallic disk 66e, and conductor 80, to conductor 20b. Motor 44 moves shaft 68 and disks 66a to 66f of assembly 42 until assembly 42 and contact assembly 41 return to a relative position which allows resynchronization after pull out on full voltage without overheating of the cage winding. Synchronous motor 44 remains energized until this intermediate step of resetting is completed, and is deenergized when disk 66e disengages contact 61e, which then rests on insulating insert 76e. This takes place with a time delay after which the cage winding and reactor 21 have sufficiently cooled down to thereby control the changes in the connection of motor 16 involved in a procedure of resynchronization after pull out under overload. The slip cycle relay 40 then has completed a successful starting cycle.

If the synchronous motor 16 is shut down from a normal running condition by the operation of a trip pushbutton 90, the operation of the circuit breakers is as follows:

Upon the closure of trip pushbutton 90 current flows from conductor 20c, through pushbutton 90, and trip coil 91 of the starting breaker 22 to conductor 20b. The starting breaker 22 opens and causes the opening of the running breaker 23 and the field contactor 28. The running breaker's trip coil 92 is energized as follows:

Upon the opening of starting breaker 22, contacts 22d complete a circuit from conductor 20c, contacts 22d, trip coil 92 of running breaker 23, and conductor 86 to conductor 20b to cause running breaker 23 to open.

The coil 31 of the field contactor 28 is deenergized by opening of the contacts 23d of the running breaker 23 which interrupts the current which flows from conductor 20c through conductors 83, 84, coil 31 of field breaker 28, contacts 30 of relay 29, conductor 85, contacts 23d, and conductor 86 to conductor 20b. Contactor 28 returns to the starting position, and motor 16 is then completely shut down.

Under the influence of this above condition the slip cycle relay 40 performs the following reset functions. With the starting breaker 22 open, current flows from conductor 20c, through conductor 83, motor 44, conductor 87, the contacts 22h of the starting breaker 22, conductors 93, 95, finger contact 61c, conducting disk 66c, and conductor 80 to conductor 20b. Motor 44 continues the resetting operation as during starting until cage winding 19 has cooled sufficiently to stand another start. The resetting operation of relay 40 is then completed by the action of auxiliary relay device 49 which functions as follows:

With the starting breaker 22 open at a predetermined time in the resetting operation, current also flows from conductor 20c, through conductor 83, the conducting ring of disk 66f, contact 74f, and finger contact 61f, the starting breaker contacts 22f, the coil 94 of auxiliary relay 49, conductor 95, finger contact 61c, conducting ring 75c, and conductor 80 to conductor 20b. The relay 49 immediately locks itself into the closed position by keeping its operating coil energized in the following manner. With relay 49 closed, current flows from conductor 20c through conductor 83, contact 49e, conductor 96, contacts 22f of starting breaker 22, the relay coil 94 of auxiliary relay 49, conductor 95, finger contact 61c, conductive disk 66c, and conductor 80 to conductor 20b. Relay 49 stays energized until the fast resetting motion is stopped by the separation of finger contact 61c and the conductive disk 66c, which interrupts the coil circuit to the auxiliary relay 49. The operation of relay 49 causes the fast resetting by energizing device 43 with sixty cycle current taken from the supply source 20.

The operation for fast resetting of relay 40 is as follows:

With coil 94 of relay 49 energized, current flows from conductor 20b through conductor 80, contacts 49a, half wave rectifier 46, relay 43, contacts 49c, and conductor 83 to conductor 20c. While motor 44 continues to drive disk assembly 42 relatively slowly, relay 43 drives finger contact assembly 41 in the same direction but at a much higher speed. The finger contact assembly 41 therefore overtakes the disk assembly 42 in a much shorter time than would be required for the disk assembly 42 to reach contact assembly 41 assumed to remain stationary. After a predetermined number of actuations of stepping relay 43 in response to each cycle of the voltage of circuit 20, the slip cycle relay 40 has completed its resetting motion, and the synchronous motor slip cycle relay 40 is again ready for operation.

Assume next a condition in which the field contactor 28 does not close for any reason such as failure of this particular device or because the synchronous motor 16 has to carry too much load during the starting period. After the starting pushbutton 77 is pressed, the operation of the starting and running breakers and of the slip cycle relay control arrangement, is exactly as described above up to the time of synchronization. Transfer from starting to running will be exactly as before, except that depending upon the speed of the synchronous motor 16, contacts of the slip cycle relay 40 will close somewhat sooner because of the higher slip cycle frequency. However, as synchronous operation of motor 16 is not attained, the slip cycle relay does not reset and instead it continues to count the slip cycles until its lockout contacts 61b and 74b engage.

When the lockout contacts 61b and 74b engage, stepping relay 43 has been actuated a predetermined number of times to count out a definite number of slip cycles, at which time cage winding 19 exceeds its highest permissible temperature. The slip cycle relay control arrangement operates as follows:

Current flows from conductor 20c through conductor 83, conductive strip 73b and contact 74b of disk 66b, finger contact 61b, conductor 97, and trip coil 91 of starting breaker 22 to conductor 20b. Coil 91 trips the starting breaker 22 and in so doing energizes the trip coil 92 of the running breaker 23 as previously described to lockout motor 16. Slip cycle relay 40 only then begins to reset as above described to control the reconnection of motor 16 after a predetermined time delay.

Contacts 66d and 61d which are then open, are interlocking contacts in series with the closing coil 78 of the starting breaker 22 and prevent restarting of motor 16 before relay 40 is reset after the starting breaker has been opened by the lockout contacts 61d and 74d.

After motor 16 is locked out, the operation for restarting by means of contacts 61d and 74d is as follows:

If the starting pushbutton 77 is prematurely closed, i. e., before cage winding 19 has dropped sufficiently to stand a starting operation, a circuit is only partly completed from conductor 20c through pushbutton 77, closing coil 78 of starting breaker 22, conductor 79 to finger contact 61d. If the pushbutton 77 is held closed, starting of the motor 16 will take place in the manner above described, at the moment finger contact 61d engages contact 74d on disk 66d to complete the pushbutton circuit through the slip cycle relay 40 and conductor 80 to conductor 20b.

The system described above is only one of several possible systems for starting a synchronous machine. The contacts of the slip cycle relay have to be adjusted to perform the function which is to be coordinated with the operation of the primary breakers, the latter being provided with the proper auxiliary contacts, breakers which may be either normally opened or normally closed as conditions require. There is also a possibility of using a variety of field application systems, one of which has been incorporated in the above described arrangement. The use of other field application system does not affect the operation or the protective features of the above described slip cycle relay.

The relay, which is essentially sensitive to an accumulated differential of two frequencies, can be arranged to perform other functions for which this particular characteristic is required. The following applications may serve as examples.

Synchronization between two sources of power on the basis of frequency and number of slip or interference cycles. Synchronization of a generator with a power line. In this case, device 44 is connected to the power line and device 43 to the generator which is to be synchronized. The relay contacts are built and arranged to perform the function of giving impulses to the governor motor in proportion to the relative position of the contacts on contact assembly 41 as compared with the contacts on contact assembly 42.

Figs. 11 to 14 illustrate a modification of the control arrangement shown in Figs. 1 to 10. This modification illustrates another way of using this invention, and although a full voltage starting arrangement is shown for simplicity, the arrangement can also be used for reduced voltage starting of synchronous machines. The same reference characters have been used in Figs. 11 to 14 as in Figs. 1 to 10 for similar elements.

In this embodiment of the invention the slip cycle relay 100 comprises two cycle counting contact assemblies 101 and 102 which can be rotated with respect to each other to any extent. Contact assemblies 101 and 102 are similar to contact assemblies 41, 42 shown in Figs. 1 to 10; however, assemblies 101 and 102 are mounted in a different manner. Finger contact assembly 101 is rotated directly by means of the stepping relay 43. Disk contact assembly 102 may be rotated by relay 43 through the medium of a clutch 103 and a gear train 104, or may be held stationary by a brake 114.

Figure 12:
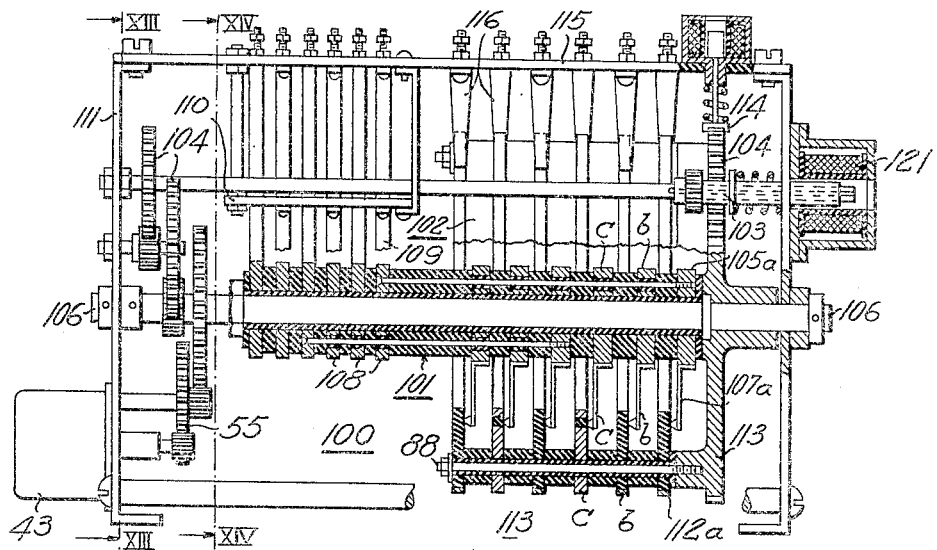
Fig. 12 is a sectional side view of the control device illustrated in Fig. 11 and constructed in accordance with the present invention.
Figure 13:
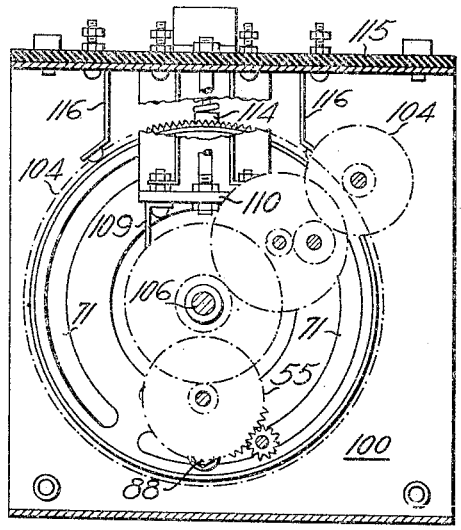
Fig. 13 is a sectional view of the device of Fig. 12 taken along the line XIII—XIII.
Figure 14:
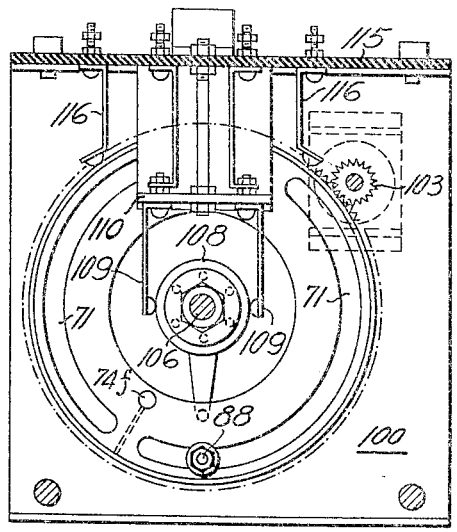
Fig. 14 is a sectional view of the device of Fig. 12 taken along the line XIV—XIV.

Contact assembly 101 comprises a plurality of juxtaposed coaxial rotatable members 105a to 105c arranged on a shaft 106. The members are provided with finger contacts 107a to 107c which serve as current carrying members. The members 105a, 105b and 105c all rotate together as a unit and are mechanically tied together with a plurality of coaxially arranged slip rings 108. Rings 108 are conductively connected by brushes 109 to terminals of a terminal board 110 arranged on a frame 111. As shown in Fig. 12, any number of members 105 and slip rings 108 may be mounted on shaft 106 depending on the need.

Finger members or contacts 107a to 107c make electrical contact with a plurality of juxtaposed separately angularly adjustable coaxial rotatable members or disks 112a to 112c, the number of disks depending on the need. Disks 112 are secured to a rotatable drum 113 which is rotated about shaft 106 when connected to the gear train 55 of shaft 106 by clutch 103 and gear train 104. Disks 112 make electrical contact with terminals of a terminal board 115 through a plurality of brushes 116.

Disks 112 include two types similar to the two types illustrated in Figs. 1 to 10 and therefore will not be described again.

In accordance with the invention, the slip cycle synchronous motor protective relay arrangement functions as follows:

Upon closing the start pushbutton 77, current flows from conductor 20c, through the pushbutton 77, the closing coil 78 of circuit breaker 22, conductor 117, finger contact 107c and disk 112c of the slip cycle relay 100 and conductor 118 to conductor 20b. Circuit breaker 22 closes, and causes energization of the stator winding 17 of the synchronous motor 16. Current flowing through the stator winding 17 induces currents in cage winding 19 and field winding 18. The synchronous motor 16 starts to rotate upon energization of stator winding 17, and induced current in the field winding starts to circulate through the discharge resistor 32, and the auxiliary contact 28a of the field contactor 28. The closing of the circuit breaker 22 causes energization of the auxiliary relay coil 94 by the flow of current from conductor 20b through contacts 22d, conductor 119, coil 94, and conductor 120 to conductor 20c. Current also flows through the releasing coil of brake 114 and through clutch actuating coil 121 which are connected in parallel with the auxiliary relay coil 94 through contacts 28d. When the electrically operated clutch and the auxiliary relay 49 are energized, contact assemblies 101 and 102 are both engaged with the driving mechanism 54.

Current also flows from one terminal of the discharge resistor 32 through a conductor 122, contacts 49c of the closed relay 49, rectifier 46, stepping relay 43, contacts 49a of relay 49, and a conductor 123, to the other terminal of the discharge resistor 32. The contact assemblies 101 and 102 are then under the influence of the driving force of stepping relay 43 and rotate at different speeds both proportional to the slip cycle frequency of the synchronous motor 16. If the synchronous motor 16 comes up to speed within a predetermined number of slip cycles, the field contactor 28 closes as above described, and the starting operation is completed. The slip cycle relay 100 is so adjusted that if it takes such time to bring the synchronous motor 16 up to synchronous speed that the cage winding 19 exceeds its highest permissible temperature, the slip cycle relay 100 closes its contacts 107a and 112a and trips the starting breaker 22. This tripping function occurs when current from conductor 20c flows through conductor 124, finger contact 107a, disk 112a, conductor 125, trip coil 91 of starting breaker 22 and contacts 22e of starting breaker 22, to conductor 20b.

If synchronization of motor 16 is accomplished before the predetermined number of slip cycles have been counted out by relay 100, the field breaker 28 will be closed as described heretofore in the description of Figs. 1 to 10.

After the synchronous motor 16 has been brought up to speed and the field contactor 28 has closed, the slip cycle relay resets itself to its normal starting position in a predetermined time which is equal to the cooling time of the cage winding 19 of motor 16. The relay 100 resets itself in the following manner:

When the field contactor 28 closes, its contacts 28d open and deenergize the coil 94 of auxiliary relay 49 and also the electrically operated clutch 103. The tripping of the auxiliary relay 49 connects the frequency relay coil 43 to the sixty cycle supply source 20, thereby rotating the gear mechanism 55 and shaft 106 at a faster speed than normal counting slip cycle relay action. Contact assembly 101 then rotates alone until the contacts 107b and 112b interrupt the circuit through the stepping relay 43 in the manner above described.

If the operator pushes the stop pushbutton 90 and stops motor 16 without synchronization having taken place or before the relay has had time to go through its reset period, restarting of the synchronous motor 16 is prevented by the lockout contacts 107c and 112c which are arranged to close only after relay 100 has returned to its reset position.

It is possible to replace the stepping relay and rectifier 46 with a synchronous motor which is designed to operate with a frequency from sixty cycles down to approximately two cycles.

With proper contact arrangement it is possible to use the slip cycle relay equipped with the electrically operated clutch for reduced voltage starting of a synchronous motor.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In combination, an alternating current machine having a primary winding connected to an alternating current circuit and having a secondary winding, a counting device, means for actuating said device in response to each cycle of induced current in said secondary winding, means responsive to a first predetermined number of actuations of said device for effecting a first change in the connections of said machine, and means responsive to a second predetermined number of actuations of said device for effecting a second predetermined change different from said first change in the connections of said machine.

2. In combination, an alternating current machine having a primary winding connected to an alternating current circuit and having a secondary winding, a first counting device, a second counting device, means for actuating said first device in response to each cycle of induced current in said secondary winding, means responsive to a predetermined number of actuations of said first device for disconnecting said primary winding from the alternating current circuit, means responsive to disconnection of said primary winding from the alternating current circuit for actuating said second device in response to each cycle of the voltage of the alternating curent circuit, and means responsive to a second predetermined number of actuations of said second device for controlling the reconnection of said primary winding to said alternating current circuit, said second number being correlated with the temperature of said secondary winding.

3. In combination, an alternating current machine having a primary winding connected to an alternating current circuit and having a secondary winding, a first counting device, a second counting device, means for actuating said first device in response to each cycle of induced curent in said secondary winding, means responsive to a predetermined number of actuations of said first device for disconnecting said primary winding from the alternating curent circuit, means responsive to disconnection of said primary winding from the alternating current circuit for actuating said second device in response to each cycle of the voltage of the alternating current circuit, and means responsive to a second predetermined number of actuations of said second device including contact means for controlling the reconnection of said primary winding to said alternating current circuit, said second number being correlated with the temperature of said secondary winding.

4. In combination, an alternating current machine having a primary winding connected to an alternating current circuit and having a secondary winding, a first counting device, a second counting device, means for actuating said first device in response to each cycle of induced current in said secondary winding, means for actuating said second device in response to impulses supplied at uniform time intervals, means responsive to a predetermined number of actuations of said first device for effecting a first change in the connections of said machine, and means sequentially operative with said first means and responsive to said first counting device and a time delay action of said second counting device for controlling a second predetermined change in the connection of said machine, said time delay action being correlated with the temperature of said secondary winding.

5. In combination, an alternating curent machine having a primary winding connected to an alternating current circuit and having a secondary winding, a counting device, means for actuating said device in response to each cycle of induced heating current in said secondary winding, means for actuating said device in relation to the cooling rate of said secondary winding, and means controlled by said device responsive to the number of actuations of said device by said first means and to the number of actuations of said device by said second means for controlling the primary winding connection to said circuit.

6. In combination, an alternating current machine having a primary winding connected to an alternating current circuit and having a secondary winding, a first counting device, means for actuating said first device in response to each cycle of induced heating current in said secondary winding, a second counting device, means for actuating said second device in relation to the temperature of said secondary winding, and means controlled by said first device and responsive to the number of actuations of said first device and to the number of actuations of said second device for controlling the primary winding connections to said circuit.

7. In combination, an alternating current machine having a primary winding connected to an alternating current circuit and having a secondary winding, a counting device, means for actuating said device in response to each cycle of induced current in said secondary winding, means responsive to a predetermined number of actuations of said device for disconnecting said primary winding from the alternating current circuit, means for actuating said device in relation to the cooling rate of said secondary winding, and means responsive to another predetermined number of operations of said device for controlling the reconnection of said primary winding to the alternating current circuit.

8. In combination, an alternating current machine having a primary winding connected to an alternating current circuit and having a secondary winding, a counting device, means for actuating said device in response to each cycle of induced current in said secondary winding, means responsive to a first predetermined number of actuations of said device for disconnecting said primary winding from said alternating current circuit, and means for resetting said device in relation to the temperature of said secondary winding for controlling the reconnection of said primary winding to said alternating current circuit.

9. In combination, an alternating current machine having a primary winding connected to an alternating current circuit and having a secondary winding, a timing switch comprising adjustable disk means and contact means cooperating with said adjustable disk means, said contact and disk means being movable into a first predetermined relative position to control the connection of said primary winding to said alternating current circuit and both being movable into a second predetermined relative position to disconnect said primary winding from said alternating current circuit and to prevent reconnection of said primary winding to said alternating current circuit, a stepping relay actuated in response to each cycle of induced current in said secondary winding for actuating said contact means into said second position, and means for actuating said disk means to said first position to terminate said reconnection preventing action in a time proportional to the average cooling time of said secondary winding.

10. In combination, an alternating current machine having a primary winding connected to an alternating current circuit and having a secondary winding, a timing switch comprising adjustable disk means and contact means cooperating with said adjustable disk means, said contact and disk means being movable into a first predetermined relative position to control the connection of said primary winding to said alternating current circuit, a stepping relay actuated in response to each cycle of induced current in said secondary winding for actuating said contact means into a second position indicating the temperature of said secondary winding, and means for actuating said disk means to said first position in a time proportional to the average cooling time of said secondary winding.

11. In combination, an alternating current machine having a primary winding connected to an alternating current circuit and having a secondary winding, a timing switch comprising disk means and contact means cooperating with said disk means, said contact and disk means in a first predetermined relative position controlling the connection of said primary winding to said alternating current circuit and in a second predetermined relative position disconnecting said primary winding from said alternating current circuit, a stepping relay actuated in response to each cycle of induced current in said secondary winding for actuating said contact means from said first position toward said second position, and means for actuating disk means back toward said first position with a speed which is in a predetermined relation to the average cooling rate of said secondary winding.

12. In combination, an alternating current machine having a primary winding connected to an alternating current circuit and having a secondary winding, a timing switch comprising disk means and contact means cooperating with said disk means, said contact and disk means in a first predetermined relative position controlling the connection of said primary winding to said alternating current circuit and in a second predetermined relative position disconnecting said primary winding from said alternating current circuit, a stepping relay actuated in response to each cycle of induced current in said secondary winding for actuating said contact means from said first position toward said second position, and means comprising a time delay device supplied by impulses at uniform time intervals for actuating said disk means back toward said first position with a speed which is in a predetermined relation to the average cooling rate of said secondary winding.

13. In combination, an alternating current machine having a primary winding connected to an alternating current circuit and having a secondary winding, a timing switch comprising disk means and contact means cooperating with said disk means, said contact and disk means in a first predetermined relative position controlling the connection of said primary winding to said alternating current circuit and in a second predetermined relative position disconnecting said primary winding from said alternating current circuit, a stepping relay actuated in response to each cycle of induced current in said secondary winding for actuating said contact means from said first position toward said second position, and means for moving said contact means and disk means back to said first relative position with a speed which is in a predetermined relation to the average cooling rate of said secondary winding.

14. In combination, an alternating current machine having a primary winding connected to an alternating current circuit and having a secondary winding, a timing switch comprising first and second cycle counting contact assemblies arranged in a first predetermined relative position, said contact assemblies arranged to be rotated with respect to each other, a stepping relay actuated in response to each cycle of induced current in said secondary winding for causing simultaneous rotation of said contact assemblies from said first position at different speeds both proportional to the slip cycle frequency of said machine, and means responsive to the travel of said contact assemblies into a second predetermined relative position for disconnecting said primary winding from said alternating current circuit and connecting said stepping relay to a uniform frequency source for rotating said second contact assembly back to said first relative position with a speed which is in a predetermined relation to the average cooling rate of said secondary winding.

15. In combination, an alternating current machine having a primary winding connected to an alternating current circuit and having a secondary winding, a timing switch comprising first and second cycle counting contact assemblies arranged in a first predetermined relative position, said contact assemblies arranged to be rotated with respect to each other, a stepping relay actuated in response to each cycle of induced current in said secondary winding for causing simultaneous rotation of said contact assemblies from said first position at different speeds both proportional to the slip cycle frequency of said machine, and means responsive to the speed of rotation of said machine for connecting said stepping relay to a uniform frequency source for rotating said second contact assembly back to said first relative position with a speed which is in a predetermined relation to the average cooling rate of said secondary winding.

16. In combination, an alternating current machine having a primary winding connected to an alternating current circuit and having a secondary winding, a timing switch comprising first and second cycle counting contact assemblies arranged in a first predetermined relative position, said contact assemblies arranged to be rotated with respect to each other, a clutch connected between said contact assemblies, a stepping relay actuated in response to each cycle of induced current in said secondary winding for actuating said clutch to cause simultaneous rotation of said contact assemblies from said first position at different speeds both proportional to the slip cycle frequency of said machine, and means responsive to the travel of said contact assemblies into a second predetermined relative position for disconnecting said primary winding from said alternating current circuit, deenergizing said clutch and connecting said stepping relay to a uniform frequency source for rotating said second contact assembly back to said first relative position with a speed which is in a predetermined relation to the average cooling rate of said secondary winding.

17. In combination, an alternating current machine having a primary winding connected to an alternating current circuit and having a secondary winding, a timing switch comprising first and second cycle counting contact assemblies arranged in a first predetermined relative position, said contact assemblies arranged to be rotated with respect to each other to any extent, a clutch connected between said contact assemblies, a brake connected to said second contact assemblies, a stepping relay actuated in response to each cycle of induced current in said secondary winding for actuating said clutch and deenergizing said brake to cause simultaneous rotation of said contact assemblies at different speeds both proportional to the slip cycle frequency of said machine, and means responsive to the travel of said contact assemblies into a second predetermined relative position for disconnecting said primary winding from said alternating current circuit, deenergizing said clutch, energizing said brake and connecting said stepping relay to a uniform frequency source for rotating said second contact assembly back to said first relative position with a speed which is in a predetermined relation to the average cooling rate of said secondary winding.

18. In combination, an alternating current machine having a primary winding connected to an alternating current circuit and having a secondary winding, a timing switch comprising first and second cycle counting contact assemblies arranged in a first predetermined relative position, said contact assemblies arranged to be rotated with respect to each other to any extent, a clutch connected between said contact assemblies, a brake connected to said second contact assembly, a stepping relay actuated in response to each cycle of induced current in said secondary winding for actuating said clutch and deenergizing said brake to cause simultaneous rotation of said contact assemblies at different speeds both proportional to the slip cycle frequency of said machine, and means responsive to the speed of rotation of said machine for deenergizing said clutch, energizing said brake and connecting said stepping relay to a uniform frequency source for rotating said second contact assembly back to said first relative position with a speed which is in a predetermined relation to the average cooling rate of said secondary winding.

19. In combination, an alternating current machine having a primary winding connected to an alternating current circuit and having a secondary winding, a counting device, means for actuating said device in response to each cycle of induced current in said secondary winding, means responsive to a first predetermined number of actuations of said device for disconnecting said primary winding from said alternating current circuit, and means responsive to a second predetermined number of actuations of said device for resetting said device in relation to the temperature of said secondary winding for controlling the reconnection of said primary winding to said alternating current circuit.

20. In combination, an alternating current machine having a primary winding connected to an alternating current circuit and having a secondary winding, a first counting device, means for actuating said first device in response to each cycle of induced current in said secondary winding, means responsive to a first predetermined number of actuations of said first device for disconnecting said primary winding from said alternating current circuit, a second counting device, means for actuating said second device in response to each cycle of voltage of said alternating current circuit, and means responsive to a second predetermined number of actuations of said second device for resetting said first device.

21. In combination, an alternating current machine having a primary winding connected to an alternating current circuit and having a secondary winding, a counting device, means for actuating said device in response to each cycle of induced current in said secondary winding, means responsive to a first predetermined number of actuations of said device for disconnecting said primary winding from said alternating current circuit, and means for resetting said device for controlling the reconnection of said primary winding to said alternating current circuit.

References Cited in the file of this patent
UNITED STATES PATENTS

| Number | Name | Date |
| --- | --- | --- |
| 2,200,105 | Stevenson | May 7, 1940 |
| 2,245,189 | Ewing | June 10, 1941 |
| 2,304,542 | Chambers | Dec. 8, 1942 |
| 2,308,304 | Regan | Jan. 12, 1943 |
| 2,408,226 | Pringle | Sept. 24, 1946 |
| 2,424,227 | Eigenberger | July 22, 1947 |
| 2,439,920 | Brown | Apr. 20, 1948 |